US011211187B2

(12) United States Patent
Chen et al.

(10) Patent No.: US 11,211,187 B2
(45) Date of Patent: Dec. 28, 2021

(54) MAGNETIC MATERIALS WITH ULTRAHIGH RESISTIVITY INTERGRAIN NANOPARTICLES

(71) Applicant: Northeastern University, Boston, MA (US)

(72) Inventors: Yajie Chen, Brighton, MA (US); Parisa Andalib, Malden, MA (US); Vincent Harris, Sharon, MA (US)

(73) Assignee: Northeastern University, Boston, MA (US)

( * ) Notice: Subject to any disclaimer, the term of this patent is extended or adjusted under 35 U.S.C. 154(b) by 429 days.

(21) Appl. No.: 16/181,298

(22) Filed: Nov. 5, 2018

(65) Prior Publication Data

US 2019/0139687 A1    May 9, 2019

Related U.S. Application Data

(60) Provisional application No. 62/581,408, filed on Nov. 3, 2017.

(51) Int. Cl.
*H01F 1/34* (2006.01)
*H01F 3/08* (2006.01)
(Continued)

(52) U.S. Cl.
CPC ......... *H01F 1/344* (2013.01); *C04B 35/2608* (2013.01); *C04B 35/2658* (2013.01); *C04B 35/2666* (2013.01); *C04B 35/64* (2013.01); *H01F 3/08* (2013.01); *H01F 41/0246* (2013.01); *C04B 2235/3215* (2013.01); *C04B 2235/3225* (2013.01); *C04B 2235/3236* (2013.01); *C04B 2235/3263* (2013.01); *C04B 2235/3274* (2013.01); *C04B 2235/3275* (2013.01); *C04B 2235/3284* (2013.01); *C04B 2235/5454* (2013.01); *C04B 2235/604* (2013.01); *C04B 2235/656* (2013.01); *C04B 2235/6567* (2013.01); *C04B 2235/6583* (2013.01);
(Continued)

(58) Field of Classification Search
CPC .................................. H01F 1/344; H01F 3/08
See application file for complete search history.

(56) References Cited

U.S. PATENT DOCUMENTS 3,542,685 A * 11/1970 Iwase ................. G11B 5/70678
                                                     252/62.62
9,117,565 B2    8/2015 Chen et al.
2012/0286920 A1* 11/2012 Chen ......................... H01F 3/08
                                                     336/233

OTHER PUBLICATIONS

Akhtar. Y3Fe5O12nanoparticulate garnet ferrites: Comprehensive study on the synthesis and characterization fabricated by various routes. Journal of Magnetism and Magnetic Materials 368 (2014) 393-400 (Year: 2014).*

(Continued)

*Primary Examiner* — Matthew E. Hoban
(74) *Attorney, Agent, or Firm* — Verrill Dana, LLP (57) ABSTRACT

A composite magnetic material has a plurality of grains having a magnetic ferrite phase, grain boundaries surrounding the grains, and a plurality of nanoparticles disposed at the grain boundaries. The nanoparticles of the composite material are both magnetic and electrically insulating, having a magnetic flux density of greater than about 100 mT and an electrical resistivity of at least about $10^8$ Ohm-cm. Also provided is a method of making the composite material. The material is useful for making inductor cores of electronic devices.

19 Claims, 3 Drawing Sheets

(51) Int. Cl.
*H01F 41/02* (2006.01)
*C04B 35/26* (2006.01)
*C04B 35/64* (2006.01)

(52) U.S. Cl.
CPC .. *C04B 2235/6586* (2013.01); *C04B 2235/72* (2013.01); *C04B 2235/763* (2013.01); *C04B 2235/764* (2013.01); *C04B 2235/767* (2013.01); *C04B 2235/785* (2013.01); *C04B 2235/786* (2013.01); *C04B 2235/85* (2013.01); *C04B 2235/94* (2013.01)

(56) References Cited

OTHER PUBLICATIONS

Andalib, P. et al., "Concurrent Core Loss Suppression and High Permeability by Introduction of Highly Insulating Intergranular Magnetic Inclusions to MnZn Ferrite", IEEE Magnetics Letters, vol. 9, pp. 1-5, 2018 doi: 10.1109/LMAG.2017.2771391.

* cited by examiner

MAGNETIC MATERIALS WITH ULTRAHIGH RESISTIVITY INTERGRAIN NANOPARTICLES

U.S. Provisional Application No. 62/581,408, filed 3 Nov. 2017, is hereby incorporated by reference in its entirety.

BACKGROUND

Ferrites are essential materials for electronic applications that generate, condition, or convert power at frequencies from dc to several gigahertz in devices such as switch mode power supplies, power converters, filters, and chokes. A principal challenge in the design and production of ferrite elements is the management of escalating heat dissipation and its impact upon overall system efficiency. Strategies to mitigate the high heat density include minimization of heat generated, effective removal of heat, and allowing the device to run hot. All of these approaches pose significant challenges to radio-frequency engineers and materials scientists alike.

Minimization of heat generated can be achieved by targeting the efficiency of the inductor core, such as by reducing the core power-loss (CPL). CPL, and thus the heat generated in magnetic components, consists of three frequency-dependent mechanisms: quasi-static hysteretic losses ($P_h$), classical eddy current losses ($P_e$), and excess eddy current or residual losses ($P_r$). Among these, classical eddy current losses are the principal contributor to CPL at higher frequencies. This component of loss is due to induced eddy currents that oppose the applied alternating magnetic fields. Hence, one approach to reduce the eddy current loss is to restrict the flow of eddy currents by increasing the resistivity of polycrystalline ferrite cores. For this purpose, insulating oxide particles, e.g., $CaO$, $SiO_2$, $Nb_2O_5$, $Ta_2O_5$, $HfO_2$, $ZrO_2$, and $V_2O_5$, have been shown to preferentially increase the grain boundary resistance of the cores by segregating to grain boundary regions, resulting in a decrease in eddy current loss (Akashi et al., 1961, Otsuki et al., 1991, Inaba et al., 1996, Znidarsic et al., 1999, and Goldman et al., 2006). However, this approach comes with a substantial cost to permeability, originating from the presence of nonmagnetic impurities at the grain boundaries and the associated increased grain boundary effective thickness, which frustrates and weakens the long-range intergranular magnetic coupling (Visser 1991, Zaspalis 2007).

U.S. Pat. No. 9,117,565, which is incorporated herein by reference, describes a different approach to reduce core losses. In this approach, 1-10 wt % of highly resistive magnetic insulating grain boundary phase of NiZn spinel ferrite is introduced into a principal $Mn_xZn_{1-x}Fe_2O_4$ (MZFO) to effectively reduce core losses for applications at frequencies greater than 1 MHz.

There remains a need for magnetic materials with reduced eddy current loss, not accompanied by a significant loss of permeability.

SUMMARY

The present technology provides a magnetic material in which, compared to conventional materials for inductor cores, the eddy current loss is reduced without substantially reducing permeability. The material is obtained by introducing insulating magnetic nanoparticles into the grain boundary regions of a polycrystalline ferrite material. The material has been found to be remarkably effective in reducing core power loss (CPL) without reducing permeability, in contrast to the tradeoff between CPL and permeability required of previous materials.

Accordingly, in one aspect, the technology provides a composite material comprising a plurality of grains of a magnetic ferrite material, grain boundaries surrounding the grains, and a plurality of nanoparticles disposed at the grain boundaries. The nanoparticles are both magnetic, having a magnetic flux density of greater than about 100 mT, and electrically insulating, having an electrical resistivity of at least about $10^8$ Ohm-cm.

Embodiments of the composite material can include one or more of the following features. The nanoparticles present in the composite can be in an amount from about 0.01 wt % to about 1 wt %. For example, the nanoparticles can be present in the composite in an amount from about 0.1 wt % to about 1 wt %. In one embodiment, the nanoparticles are present in the composite in an amount from about 0.01 wt % to less than 1 wt %. The electrical resistivity of the nanoparticles can be from about $10^8$ to about $10^{12}$ Ohm-cm. The grain size of the composite can be chosen based on the operating frequency of interest. For example, the grain size can be in a range of about 0.5 μm to about 50 μm. In one embodiment, the nanoparticles range in size from about 1 nm to about 100 nm. In some embodiments, the nanoparticles comprise high resistivity garnet, hexaferrite, or spinel ferrite. In one embodiment, the nanoparticles comprise $Y_3Fe_5O_{12}$ (YIG). In some embodiments the grains comprise a spinel ferrite. The spinel ferrite can be a zinc ferrite, a nickel-zinc ferrite, a manganese-zinc ferrite, or a cobalt ferrite. In one embodiment, the spinel ferrite is a manganese-zinc ferrite. The grains of the manganese-zinc ferrite can have a size of about 1 μm to about 30 μm. In one embodiment, the manganese-zinc ferrite is $(Mn_{0.69}Zn_{0.20})Fe_{2.11}O_4$.

In another aspect of the technology, the above-described composite material is capable of being used as a core component of an electronic device or component having an operating frequency in the range from about 100 kHz to about 1 MHz.

In another aspect, the present technology provides an inductor core comprising any of the above-described composite materials. In different embodiments, the core is selected from the group consisting of a ferrite toroid, a ferrite plate, a ferrite disk, a ferrite C core, a ferrite CI core, a planar E core, an EC core, a EFD core, a EP core, a ETD core, an ER core, a planar ER core, a U core, a RM/I core, a RM/LP core, a P/I core, a PT core, a PTS core, a PM core, a PQ core, a gapped toroid, a bobbin core, a ferrite E-core, and a ferrite EI-core. In one embodiment, the grains of the inductor comprise a spinel ferrite. The spinel ferrite can be a zinc ferrite, a nickel-zinc ferrite, a manganese-zinc ferrite, or a cobalt ferrite. In certain embodiments, the nanoparticles in the composite are present in an amount from about 0.01 wt % to about 1 wt %. In certain embodiments, the nanoparticles comprise high resistivity garnet, hexaferrite, or spinel ferrite.

In a further aspect, the present technology provides a method for making a composite material. The method comprises the steps of (a) providing a plurality of grains having a magnetic ferrite phase and magnetic grain boundaries surrounding the grains; (b) adding a plurality of nanoparticles comprising high resistivity garnet, hexaferrite, or spinel ferrite, to the grains; (c) compacting the mixture to form a core; (d) sintering the core mixture; and (e) cooling the sintered mixture to room temperature, thereby obtaining the composite material.

Embodiments of the above method can include one or more of the following features. In certain embodiments, the nanoparticles comprise $Y_3Fe_5O_{12}$ (YIG). The YIG nanoparticles can range in size from about 1 nm to about 100 nm. In certain embodiments, the grains comprise a spinel ferrite. In some embodiments, prior to sintering, the core is compacted to have the shape of a core selected from the group consisting of: ferrite toroid, a ferrite plate, a ferrite disk, a ferrite E-core, a ferrite EI-core, a ferrite C core, a ferrite CI core, a planar E core, an EC core, a EFD core, a EP core, a ETD core, an ER core, a planar ER core, a U core, a RM/I core, a RM/LP core, a P/I core, a PT core, a PTS core, a PM core, a PQ core, a gapped toroid, and a bobbin core.

In yet another aspect, the present technology provides a device or device component comprising the above-described inductor core. The device or device component can be any of a transformer; an electronic device; an inductor core; a switched mode power supply (SMPS); a power electronic device; a power converter; a power generator; power conditioning components; an inductor device; a transmit and receive module (TRM); an electronically scanned phased arrays (ESPA) system; an electronic warfare (EW) system; or conditioning components for wireless and satellite communication, radar systems, power electronics, inductive devices, electronics utilizing an SMPS, or a device or device component for wireless power transfer.

The present technology can be further summarized by the following listing of embodiments.
1. A composite material comprising:
   a plurality of grains having a magnetic ferrite phase and magnetic grain boundaries surrounding the grains; and
   a plurality of nanoparticles disposed at the magnetic grain boundaries;
   wherein the nanoparticles are both magnetic and insulating, having a magnetic flux density of greater than about 100 mT and an electrical resistivity of at least about $10^8$ Ohm-cm.
2. The composite material of embodiment 1, wherein the nanoparticles are present in the composite in an amount from about 0.01 wt % to about 1 wt %.
3. The composite material of embodiment 2, wherein the nanoparticles are present in the composite in an amount from about 0.1 wt % to about 1 wt %.
4. The composite material of embodiment 1, wherein the nanoparticles are present in the composite in an amount from about 0.01 wt % to about 0.8 wt %.
5. The composite material of any of the preceding embodiments, wherein the electrical resistivity of the nanoparticles is from about $10^8$ to about $10^{12}$ Ohm-cm.
6. The composite material of any of the preceding embodiments, wherein the material is capable of use as a core component at an operating frequency in the range from about 100 kHz to about 1 MHz.
7. The composite material of any of the preceding embodiments, wherein the grains have a size of about 0.5 μm to about 50 μm.
8. The composite material of any of the preceding embodiments, wherein the wherein the nanoparticles range in size from about 1 nm to about 100 nm.
9. The composite material of any of the preceding embodiments, wherein the nanoparticles comprise garnet, hexaferrite, or spinel ferrite.
10. The composite material of any of the preceding embodiments, wherein the nanoparticles comprise $Y_3Fe_5O_{12}$ (YIG).
11. The composite material of any of embodiments 1-9, wherein the grains comprise a spinel ferrite.
12. The composite material of embodiment 11, wherein the spinel ferrite is a zinc ferrite, a nickel-zinc ferrite, a manganese-zinc ferrite, or a cobalt ferrite.
13. The composite material of embodiment 12, wherein the spinel ferrite is a manganese-zinc ferrite.
14. The composite material of embodiment 13, wherein the manganese-zinc ferrite is $(Mn_{0.69}Zn_{0.20})Fe_{2.11}O_4$.
15. An inductor core comprising the composite material of any of the preceding embodiments.
16. The inductor core of embodiment 15, wherein the grains comprise a spinel ferrite.
17. The inductor core of embodiment 16, wherein the spinel ferrite is a zinc ferrite, a nickel-zinc ferrite, a manganese-zinc ferrite, or a cobalt ferrite.
18. The inductor core of embodiment 16, wherein the nanoparticles are present in the composite in an amount from about 0.01 wt % to about 1 wt %.
19. The inductor core of embodiment 16, wherein the wherein the nanoparticles comprise high resistivity garnet, hexaferrite, or spinel ferrite.
20. A method for making a composite material, the method comprising:
   providing a plurality of grains having a magnetic ferrite phase and magnetic grain boundaries surrounding the grains;
   adding a plurality of nanoparticles comprising high resistivity garnet, hexaferrite, or spinel ferrite, to the grains;
   compacting the mixture to form a core;
   sintering the core mixture; and
   cooling the sintered mixture to room temperature, thereby obtaining the composite material.
21. The method of embodiment 20, wherein prior to sintering, the core is compacted to have the shape of a core selected from the group consisting of: ferrite toroid, a ferrite plate, a ferrite disk, a ferrite E-core, a ferrite EI-core, a ferrite C core, a ferrite CI core, a planar E core, an EC core, a EFD core, a EP core, a ETD core, an ER core, a planar ER core, a U core, a RM/I core, a RM/LP core, a P/I core, a PT core, a PTS core, a PM core, a PQ core, a gapped toroid, and a bobbin core.
22. A device or device component comprising the core of embodiment 15, wherein the device or device component is selected from the group consisting of a transformer; an electronic device; an inductor core; a switched mode power supply (SMPS); a power electronic device; a power converter; a power generator; power conditioning components; an inductor device; a transmit and receive module (TRM); an electronically scanned phased arrays (ESPA) system; an electronic warfare (EW) system; and conditioning components for wireless and satellite communication, radar systems, power electronics, inductive devices, electronics utilizing an SNIPS, and a device or device component for wireless power transfer.

BRIEF DESCRIPTION OF THE DRAWINGS

FIG. 2B is a graph showing amplitude permeability as a function of weight fraction of YIG and BTO additives measured at 500

KHz and 30 mT at room temperature. Permeability is sustained to a high degree in YIG modified samples but not in BTO modified samples.

DETAILED DESCRIPTION

The present technology provides a composite magnetic material for simultaneously substantially reducing eddy current losses at high operating frequency while retaining long range magnetic continuity and high permeability. In addition to losses due to eddy currents, further losses, particularly at high frequency, can originate also from charge tunneling through the thin intergranular boundaries between the grains. This loss becomes noticeable and important to consider at high flux density. The significance of this nonlinear effect is due to the very strong electric field (as strong as 1.5 KV/m at 500 KHz, ~3 KV/m at 1 MHz, and 100 mT) induced across the very thin grain boundary layers, leading to the tunneling of the electric charge through these layers.

The present technology introduces electrically insulating ferrimagnetic and/or antiferromagnetic intergranular nanoinclusions at the grain boundary region of a polycrystalline material. In addition to reducing eddy current losses, incorporation of these electrically insulating nanoinclusions can effectively act to also reduce the induced electric field across the intergranular layers and suppress the charge tunneling and the associated core power loss at high flux density and frequency. The composite material described herein can be used in cores of inductors, power supplies, power conditioners, power converters, and the like, particularly those having an operating frequency in the range from about 100 kHz to about 1 MHz. The composite materials utilize very small amounts of the insulating intergranular inclusions, far smaller than with previous technologies.

The composite material is a polycrystalline ferrite material containing microcrystallites of one or more ferrites and further containing one or more types of highly resistive ferrimagnetic and/or antiferromagnetic nanoparticles disposed at intragranular regions. Suitable ferrite materials include polycrystalline (Me1)(Me2) ferrite material wherein Me1 and Me2 are two different transition metal cations, each with Z from 22 to 32 of the periodic table. Common cations include those of the metals Ni, Mn, Co, and Zn. The term "ferrite" refers to a material having a closely-packed iron oxide lattice structure. A preferred ferrite material is the spinel MnZn ferrite having a composition of $(Mn_{1-x}Zn_x)_d(Fe_{3-d})O_4$, where x=0-1; and d=0.5-1.5. The ferrite material contains microcrystallites (crystalline grains). The grain diameter can be chosen based on the operating frequency of the device in which the material is to be used. For example, in a MnZn ferrite, an average diameter of the grains is in the range from about 1 μm to about 30 μm. The nanoparticulate highly resistive ferrimagnetic material is both magnetic, preferably having a magnetic flux density of greater than about 250 mT, and insulating, having an electrical resistivity of at least about $10^8$ Ohm-cm. The nanoparticles have an average diameter in the range from about 1 nm to about 100 nm. The highly resistive ferrimagnetic material can be any high resistivity magnetic oxide including hexaferrite, garnet, and spinel ferrites. A preferred resistive ferrimagnetic material is $Y_3Fe_5O_{12}$ (YIG).

The grain boundary region, being a discontinuity to the crystal lattice with prevalent oxygen vacancies, interrupts the indirect exchange coupling between spins of neighboring grains, and hence the exchange-decoupled grains interact via dipolar coupling (Smit et al., 1959). In the present technology, the magnetic particles introduced into the grain boundaries act to preserve the intergranular dipolar interaction by magnetically bridging the adjacent grains while simultaneously disrupting the induced long-range eddy currents. The modified ferrite cores are therefore expected to experience both low core loss and sustained permeability relative to cores modified with nonmagnetic inclusions.

The efficacy of representative ultrahigh resistivity (insulating) magnetic nanoinclusions (YIG nanoparticles) as intergranular additives to MZFO was demonstrated and compared to representative control samples of diamagnetic inclusions (BTO nanoparticles). Surprisingly, very small amounts of additives (<0.1 wt %) were shown to reduce eddy current losses by about 70% while maintaining a high permeability (<25% loss) at high frequencies (100 kHz to 1 MHz). Reduction of eddy current losses is achieved with only trace amounts of intergranular YIG additives, as low as about 0.01 to about 0.08 wt %. In different embodiments, from about 0.01 to about 0.1 wt %, or about 0.01 wt % to about 0.8 wt %, or about 0.01 wt % to about 0.9 wt %, or about 0.01 wt % to about 1 wt %, or about 0.1 wt % to about 0.8 wt %, or about 0.1 wt % to about 0.9 wt %, or about 0.1 wt % to about 1 wt % of the YIG additive is used.

Based on these weight fractions of nanoscale particles (having, e.g., 10 nm diameter), the number of these particles is sufficiently large to create the desired impact. Furthermore, these nanoparticles are electrically insulating with significantly high intrinsic resistivity of $>10^{10}$ ohm-cm. Covering grain surfaces with these electrically insulating particles significantly increases the resistivity of the induced eddy current path, thereby suppressing the eddy current loss component (the dominant component at operating frequency). YIG nanoparticles being ferromagnetic garnet, their introduction to the grain boundaries acts to preserve the intergranular dipolar interaction by magnetically bridging adjacent grains. BTO NPs on the other hand, frustrated both the eddy current and long-range intergranular magnetic interactions. Thus, the present technology allows for suppression of core power loss without the constraint of lowering permeability.

Figure 4:
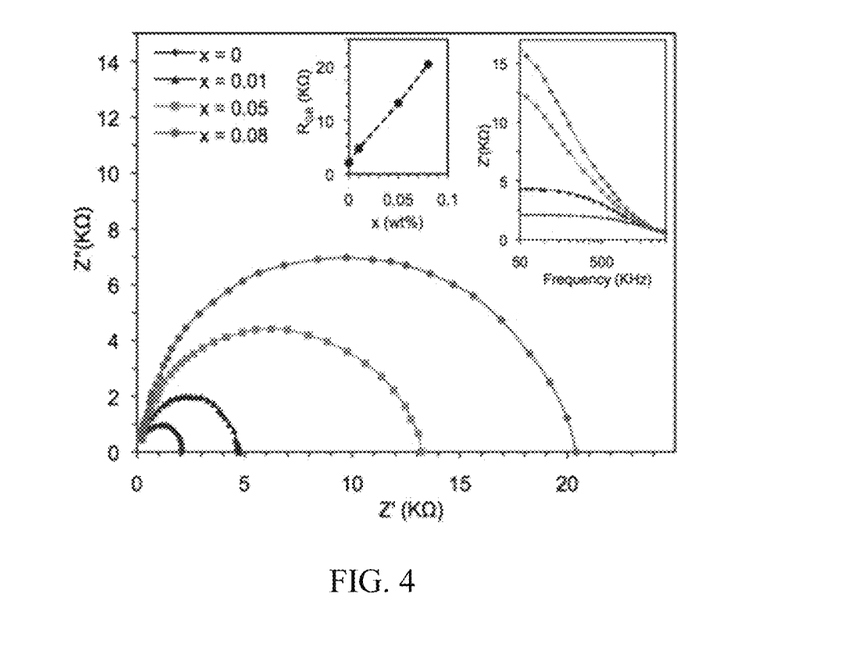
FIG. 4 is a graph showing curves for complex impedance dispersion for the parent MnZn ferrite (MZFO) and those modified with YIG NPs. The inset to the right shows the real impedance of the samples as a function of frequency. Starting from the bottom, the curves correspond to the MZFO and MZFO containing 0.01 wt %, 0.05 wt %, and 0.08 wt % of YIG NPs additive, respectively. The inset to the left shows $R_{GB}$ (grain boundary resistance) as a function of weight fraction of YIG NPs.

Contrary to intuition, increase in the weight fraction of the additive does not lead to a corresponding increase in the disruption of the current flow measured at high frequency (500 kHz to 1 MHz). Referring to the right inset to FIG. 4, the real part of the impedance of samples having different weight fractions of the additive differs greatly at lower frequencies, reflecting enhanced grain boundary resistance resulting from the introduction of additives. As frequency increases, however, the real impedance of the samples converges to the intrinsic resistance of the principal grains which change negligibly as a function of additive weight fraction. Therefore, increasing additive weight fraction does not markedly benefit eddy current loss suppression at high frequencies.

It is believed that the very high electrical resistivity of YIG insulating particles increases the electrical resistivity of the induced eddy current's path making the induced eddy current significantly weaker in the modified material compared to the parent material. Thus, a very small weight fraction (less than 0.1 wt %) of YIG leads to a high degree of suppression of power loss due to eddy current.

The intergranular nano insulators described herein are effective for applications with an operating frequency of from about 100 kHz to about 1 MHz. In other embodiments, the operating frequency range can be from about 50 kHz to about 1 MHz, or from about 50 kHz to about 800 kHz, or from about 50 kHz to about 900 kHz, or from about 100 kHz to about 800 kHz, or from about 100 kHz to about 900 kHz, or from about 50 kHz to less than 1 MHz, or from about 100 kHz to less than 1 MHz.

The composite material described herein is useful in the design and fabrication of many devices or components thereof, such as a transformer, an electronic device, an inductor core, a switched mode power supply (SNIPS), a power electronic device, a power converter, a power generator; power conditioning components, an inductor device, a transmit and receive module (TRM), an electronically scanned phased arrays (ESPA) system, an electronic warfare (EW) system, and conditioning components for wireless and satellite communication, radar systems, power electronics, inductive devices, electronics utilizing an SNIPS, and devices or device components for wireless power transfer (e.g., transcranial magnetic stimulation coils in medical applications). Inductor cores in which the composite material may be used include ferrite toroids, ferrite plates, ferrite disks, ferrite C cores, ferrite CI cores, planar E cores, EC cores, EFD cores, EP cores, ETD cores, ER cores, planar ER cores, U cores, RM/I cores, RM/LP cores, P/I cores, PT cores, PTS cores, PM cores, PQ cores, gapped toroids, bobbin cores, ferrite E-cores, and ferrite EI-cores.

EXAMPLES

Example 1

Preparation of MnZn ferrite material comprising ferrimagnetic yttrium iron garnet (YIG, $Y_3Fe_5O_{12}$) or diamagnetic barium titanate (BTO, $BaTiO_3$) nanoparticles (NPs)

Ferrimagnetic yttrium iron garnet (YIG, $Y_3Fe_5O_{12}$) and diamagnetic barium titanate (BTO, $BaTiO_3$) nanoparticles (NPs) were introduced during the processing of the semiconductor material MnZn-ferrite (MZFO) of the composition $(Mn_{0.69}Zn_{0.20})Fe_{2.11}O_4$. YIG NPs have a very high intrinsic electrical resistivity, i.e., $>10^{10}$ Ohm-cm (Sirdeshmukh, 1998). BTO was chosen as the diamagnetic control additive due to its similar electrical properties, i.e., $>10^{12}$ Ohm-cm (Wang 2003). Both additives (i.e., YIG: garnet, space group La3d; and BTO: perovskite, space group P4mm) have crystallographic structures markedly different from the MZFO (spinel, space group Fd3m) and provide incongruent grain boundary phases that act to disrupt the flow of intergranular eddy currents.

Experimental Processes and Techniques $(Mn_{0.69}Zn_{0.20})Fe_{2.11}O_4$ spinel ferrite was prepared by conventional ceramic processing methods. To accomplish this, high purity raw oxides of $Fe_2O_3$ (purity 99.95%), $Mn_3O_4$ (purity 97%, with the remainder MnO) and ZnO (purity 99.99%) were combined in nominal ratios, milled, dried and calcined at 900° C. for 4 h in air.

Two series of samples were processed with the addition of YIG and BTO NP additives. The additives were introduced into the mix prior to compaction into toroid shaped samples having an outer diameter of 13.8 mm, an inner diameter of 7.7 mm, and thickness of 2.3 mm. The YIG and BTO nanoparticles ranged in size from 10 to 100 nm with a broad size distribution. Toroidal samples were sintered at 1200° C. for 4 h under a partial oxygen pressure ($P_{O2}$) of 5% and cooled in $N_2$ gas flow of 2 L/min to room temperature. Scanning electron microscopy (SEM) and energy dispersive X-ray spectroscopy were performed within a Hitachi S4800 SEM. Phase purity of the samples was confirmed by θ-2θ, Cu kα (λ=1.5418 Å) X-ray diffraction measurements at room temperature, using a Rigaku Ultima III diffractometer.

All specimens containing the primary MZFO phase with BTO and YIG nanoparticle additives were measured for their magnetic and electrical properties, including core power loss and complex permeability, using a custom-made core loss and impedance measurement setup validated by a model 2335A Clarke Hess power analyzer.

Example 2

Core Characteristics Using Magnetic vs. Nonmagnetic Incongruent Additives

Phase purity of the samples produced according to Example 1 was confirmed by X-ray diffraction measurements in which the peak positions and relative amplitudes were shown to match closely with the spinel ferrite reference pattern for space group Fd3m. No diffraction features were observed corresponding to the small volumes of NP additives within the detection limits of the instrument. Energy dispersive X-ray spectroscopy confirmed the stoichiometry of the core samples after sintering.

Figure 1:
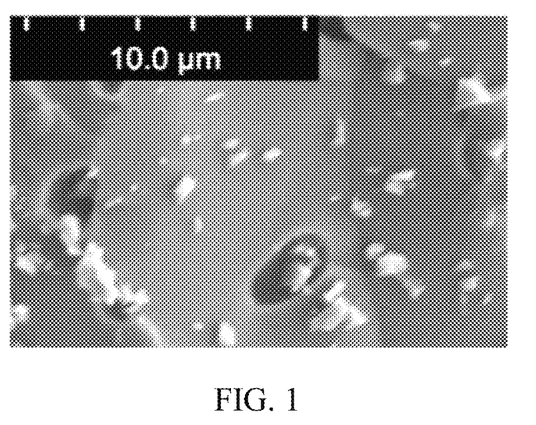
FIG. 1 is an SEM image of the fracture surface for a representative YIG-modified composite material sample (x=0.05 wt %). Clear evidence is visible for incongruent clusters decorating the surface of grains.

SEM was used to examine the fracture surface of the YIG modified sample. The SEM image of the fracture surface for a representative YIG modified sample (x=0.05 wt %) is shown in FIG. 1. The image shows a dense structure with few pores and grains uniform in size, around 12±2 μm in effective diameter, similar to the parent compound. The structure exists as a dense collection of polyhedral grains with most grains appearing as deformed dodecahedrons. As the image shows, nanoparticle clusters decorate the surface of grains. As shown in previous studies, such as the work by Hsiang (2015), the introduction of grain boundary additives can result in microstructural alterations as shown in previous studies, such as the one described by Hsiang et al., 2015. In that study, introduction of 0.5 to 1.0 wt % of micron scale $Co_2Y$ hexaferrite additives to an ultrahigh frequency NiCuZn ferrite composite resulted in a reduction in average grain size from 3 μm to 1 μm. However, due to the small amount and nanoscale nature of the additives employed in the present technology, the statistical distribution of grain size did not measurably change as determined by SEM imaging.

Figure 2A:
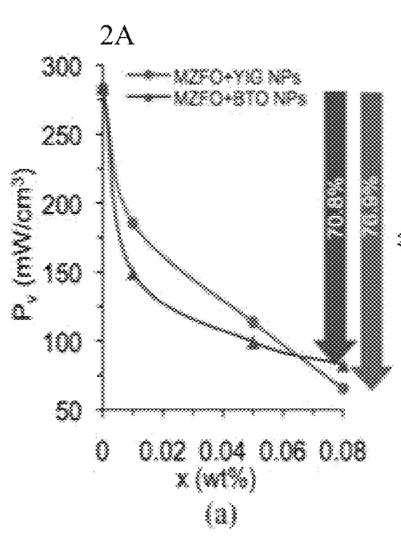
FIG. 2A is a graph showing power loss as a function of weight fraction of YIG and BTO additives measured at 500 KHz and 30 mT at room temperature. Power loss (Pv) decreases with increasing weight percent additive in comparable measure for both YIG and BTO additives.
Figure 2B:
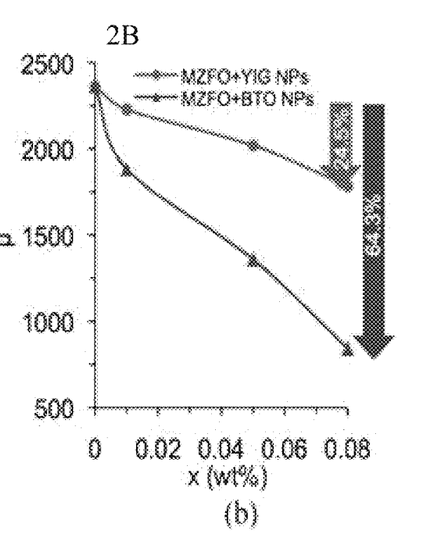

Power loss and amplitude permeability were measured for samples containing either BTO and YIG as the additive. Results for both types of samples as a function of x, where x=0, 0.01, 0.05, and 0.08 wt % of the BTO or the YIG NP additive are shown in FIGS. 2A and 2B. The measurements were made at 500 KHz, 30 mT, and room temperature. It is clear from FIG. 2A that power loss ($P_v$) decreases with increasing weight percent of additive for both YIG and BTO and the decreases are comparable (from 283.4 mW/cm$^3$ to 65.5 mW/cm$^3$ (76.9%) with addition of 0.08 wt % of YIG NPs and to 82.7 mW/cm$^3$ (70.8%) with addition of 0.08 wt % of BTO NPs). Permeability values showed a striking contrast in that the YIG-modified samples retained high permeability (1784μ, decreasing by just 24.5% for x=0.08 wt %, compared to the BTO-modified samples which experience a 64.3% reduction to 843 for the same additive weight percent.

The sustained permeability in the YIG-modified samples derives from the intergranular magnetic interactions, largely undisturbed by the collocation of ferrimagnetic YIG nanoparticles at the grain boundary regions. In contrast, the BTO-modified samples, similarly collocated to the grain boundary regions, and being diamagnetic, effectively disrupt these same long-range interactions, resulting in a diminished permeability.

The sustained permeability observed here can be justified using as a framework the nonmagnetic grain boundary (NMGB) model presented by Johnson et al., 1990. This model assumes that the grain boundaries are regions of nonmagnetic or low permeability surrounding the principal grains, which cause internal demagnetization fields. It is noteworthy that although the NMGB model considers the coexistence of both rotational and domain wall contributions to permeability, it applies to cases where spin rotation is the dominant mechanism (van der Zaag et al., 1993, 1998), and as demonstrated by van der Zaag et al., 1998, it can sufficiently describe the initial permeability behavior for low anisotropy ferrites (e.g., MZFO, specifically high permeability MZFO) with an average grain size of D≤16 μm. Also, these additives being insoluble in the lattice do not affect the intergranular domain wall dynamics and hence its contribution to permeability. Therefore, using this model, the inventors have accounted for the behavior of permeability in response to addition of nonmagnetic and magnetic inclusions, provided the rotational permeability remains the dominant contributor. According to the NMGB model, effective permeability of the polycrystalline ferrite can be expressed by μeff=μi D/(μiδ'+D); δ'=δ/μGB, where D is the average grain size, μi is the intrinsic permeability within the grain, μGB is the permeability of grain boundary, and δ' is the effective grain boundary thickness. Using this model, the increase in the effective thickness of grain boundaries due to the collocation of the nonmagnetic impurities at this region results in a substantial sacrifice of permeability. In an alternative scenario, the similar collocation of the magnetic inclusions of the same approximate size does not act to increase the effective thickness of this region as much. This is due to the contribution of the magnetic inclusions to the intergranular dipolar interaction and the corresponding enhancement in the effective permeability of grain boundaries, i.e., μGB+IMI, which according to this model is represented as δ'=δ/μGB+IMI.

Example 3

Impact of Insulating Inclusions on Electrical Response

Figure 3:
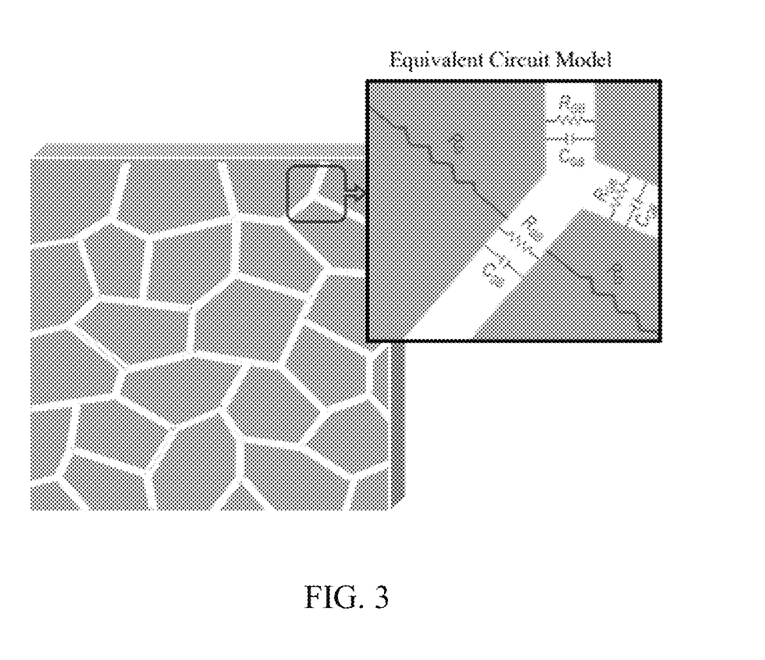
FIG. 3 is a diagram showing modeling of a polycrystalline ferrite (MnZn) with an equivalent circuit.

Complex impedance spectroscopy was employed to distinguish the electrical behavior of the grain boundary region from that of the bulk grains to understand the mechanism underlying the loss of suppression using the present technology, as well as to confirm the microstructural dispersion of the insulating inclusions. From an electrical point of view, polycrystalline ferrites can be modeled with an equivalent circuit (FIG. 3). In this model, the principal grain is represented by a resistance $R_G$ in series with a parallel combination of resistance $R_{GB}$ and capacitance $C_{GB}$ that effectively describes the important contribution of the grain boundary insulating properties and polarization processes to the electrical behavior of polycrystalline MZFO cores (Cheng et al., 1984; Drofenik et al., 1997). The grain boundary region, being a discontinuity to the crystal lattice, is characterized as having large electrical resistance $R_{GB}$ in comparison to the principal grains $R_G$. The high $R_{GB}$ derives from a high density of defects, i.e., substitutional and interstitial atoms, and dislocations, as well as reduced electron hopping between divalent and trivalent cations due to preferential oxidation of the divalent cations (Goldman et al., 2006).

The impact of the addition of magnetic and nonmagnetic inclusions on the electrical characteristics of MZFO and that on the resistivity of each microstructural region are distinct. As can be observed from the complex impedance dispersion curves of samples with YIG NP additives (x=0.01, 0.05, and 0.08 wt %, in addition to x=0; FIG. 4), the addition of YIG NPs displaces the second intercept to higher values with increasing additives, while the first intercept remains substantially unchanged. According to the equivalent circuit model and considering that the grain boundary acts as a high resistivity material under DC conditions, the second intercept corresponding to the DC response represents the $R_G+R_{GB}$ value. In contrast, the first intercept corresponding to the high-frequency response represents the $R_G$ value only, considering that the grain boundaries are short-circuited by the high displacement current at high frequencies. As a result, the $R_G$ and $R_{GB}$ values can be obtained from the impedance dispersion curves. The $R_G$ values are found to remain largely unchanged as x is increased, whereas $R_{GB}$ values (left-side inset to FIG. 4) increase as a function of YIG NP additive weight percentage from 2.1 kΩ (x=0) to 20.4 kΩ (x=0.08 wt %). The substantial increases in $R_{GB}$ values with x, together with the negligible change in $R_G$ values, reveal that the insulating NPs, and/or their clusters, principally collocate to the grain boundary region as opposed to becoming substitutional elements in the MZFO crystal lattice.

The real part of the impedance differs greatly at lower frequencies as x is varied (right-side inset to FIG. 4) reflecting enhanced grain boundary resistance resulting from the introduction of additives. As frequency increases, the real impedance of the samples converges to the intrinsic resistance of the principal grains that change negligibly as a function of x. Furthermore, with increasing additive content the real impedance decreases more rapidly as a function of frequency. Therefore, increasing x beyond about 0.08 wt % is not expected to markedly benefit eddy current loss suppression over the frequency range of 500 kHz to 1 MHz and thus may not justify the additional loss in permeability. Additionally, the presence of the inclusions at the grain boundaries acts to lower the tunneling probability by increasing the effective thickness of the insulating grain boundary barriers. This becomes progressively more important at higher magnetic flux levels and higher frequencies, where large electric fields are induced, especially within the grain boundaries.

Example 4

Impact of Insulating Inclusions on Power Loss

From the impedance spectroscopy results, one expects to see a significant reduction in the eddy current loss corresponding to the introduction of the electrically insulating NPs to the grain boundary regions. In this section, the underlying mechanism governing the power loss suppression will be directly identified using the well-known separation of the total power loss model (STPL). One commonly used STPL model for studying MZFO CPL is the model put forth by Bertotti et al., 1988 (see also Fiorillo et al., 2014]).

$$P_V = k_h B^\beta f + k_e \sigma B^2 f^2 + 8\sqrt{\sigma G S V_0} B^{1.5} f^{1.5} \quad (1)$$

which decomposes the total power loss per unit volume PV into three terms that represent the individual hysteresis loss, classical eddy current loss, and residual loss components, respectively. B is the peak magnetic flux, f is the frequency, σ is the macroscopic conductivity, S is the cross-sectional area of the core, and G is a dimensionless constant with a value of 0.1356. $k_h$, β, $k_e$, and $V_0$ are obtained by fitting curve to the measured total energy loss data.

Figure 5:
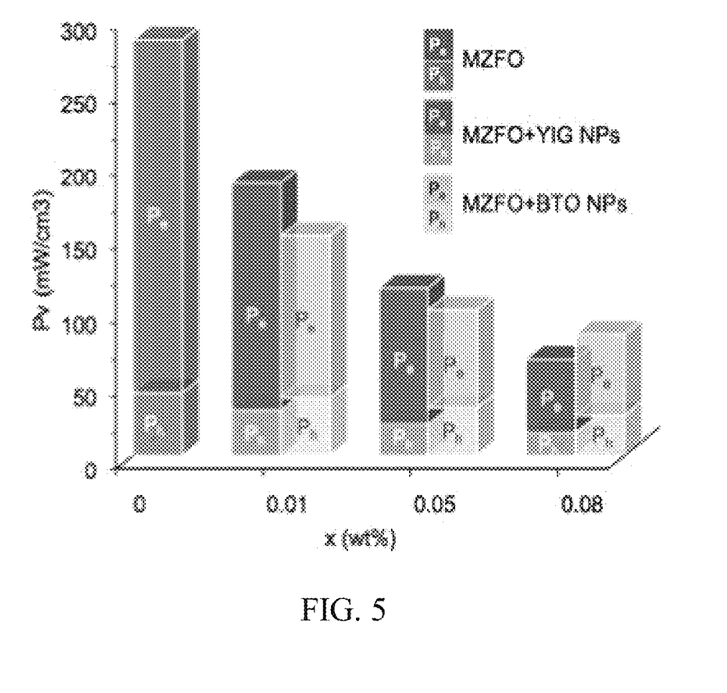
FIG. 5 is a graph showing core power loss (CPL) of sintered cores with and without NP additives. The CPL measurements were made at 300-700 kHz at intervals of 25 kHz, 30 mT, and at room temperature. $P_h$ represents quasi-static hysteretic losses and $P_e$ represents classical eddy current losses.

The power losses of the sintered cores, with and without NP additives, were measured at 300-700 kHz at intervals of 25 kHz, and 30 mT at room temperature. The obtained $P_e$ and $P_h$ values at the operating frequency of 500 kHz and 30 mT are plotted in FIG. 5 as a function of the weight percent of YIG and BTO. The residual losses were found to be negligible for these samples at operating condition of interest due to their relatively high resonance frequencies (i.e., $f_r \approx 2.6$ MHz). A comparable reduction in $P_e$ by increasing the amount of the NP additives from 0 to 0.08 wt % is realized for cores modified with YIG and BTO NPs. Total reduction in $P_e$ from the parent compound to x=0.08 wt % of YIG and BTO NPs is 190.6 mW/cm³ (79.2%) and 185 mW/cm³ (76.9%), respectively, which accounts for as much as 87.5% of the total loss reduction in response to the introduction and collocation of YIG and BTO NPs to the grain boundary region. This is while the hysteretic losses change only slightly from 42.8 to 15.5 mW/cm³ for the YIG-modified sam-ples and to 27.1 mW/cm³ for the BTO-modified samples. BTO and YIG, being incongruent additives of commensurate particle size, similarly act to physically obstruct magnetic domain wall motion. The slightly higher values of $P_h$ for the BTO-modified samples compared to the YIG-modified sample are attributed to BTO being diamagnetic where it more effectively perturbs local magnetic anisotropy fields, obstructs magnetic domain wall motion, and results in a higher hysteretic loss.

REFERENCES

Akashi T (1961), Effect of the addition of CaO and SiO$_2$ on the magnetic characteristic and microstructures of Manganese-Zinc ferrites ($Mn_{0.68}Zn_{0.21}Fe_{2.11}O_{4+\delta}$), Trans. J I M, vol. 2, pp. 171-176

Bertotti G (1988), General properties of power losses in soft ferrimagnetic materials, IEEE Trans. Magn., vol. 24, pp. 612-630

Cheng H-F (1984), Modeling of electrical response for semiconducting ferrite, J. Appl. Phys., vol. 56, pp. 1831-1837

Drofenik M, Znidarsic A, Zajc I (1997) High resistivity grain boundaries in doped MnZn ferrites for high frequency power supplies, J. Appl. Phys., vol. 82, pp. 333-340

Chiang Y M and Kingery W D (1983), Grain Boundary Composition in MnZn Ferrites, Advances in Ceramics, vol. 6, edited by Yan M F and Heuer A H, pp. 300-311, The American Ceramic Society, Columbus, Ohio, 1983

Fiorillo F, Beatrice C, Bottauscio O, Carmi E (2014), Eddy-current losses in Mn—Zn ferrites, IEEE Trans. Magn., vol. 50, 6300109

Goldman A (2006), Modern Ferrite Technology, 2nd ed. New York, N.Y., USA: Springer, pp. 70-109

Inaba H, Abe T, Kitano Y, and Shimomura J (1996), Mechanism of Core Loss and the Grain-Boundary Structure of Niobium-Doped Manganese-Zinc Ferrite, J. Solid State Chem., vol. 121, pp. 117-128

Johnson M T and Visser E G (1990), A coherent model for the complex permeability in polycrystalline ferrites, IEEE Trans. Magn., vol. 26, pp. 1987-1989

Otsuki E, Yamada S, Otsuka T, Shoji K, Sato T (1991), Microstructure and physical properties of Mn—Zn ferrites for high-frequency power supplies, J. Appl. Phys., vol. 69, pp. 5942-5944

Sirdeshmukh, L, Kumar, K K, Laxman, S B, Krishna, A R, and Sathaiah, G (1998), Dielectric properties and electrical conduction in yttrium iron garnet (YIG), Bull Mater Sci (1998) 21:219

Smit J and Wijn H H P J (1959), Ferrites, Eindhoven, The Netherlands: Philips Techn. Library, pp. 30-77 van der Zaag P J, Kolenbrander M, Rekveldt M Th (1998), The effect of intragranular domain walls in MgMnZn-ferrite, J. Appl. Phys., vol. 83, pp. 6870-6872 van der Zaag P J, Ruigrok J J M, Noordermeer A, van Delden M H W M, Por P T, Rekveldt M Th, Donnet D M, Chapman J N (1993). The initial permeability of polycrystalline MnZn ferrites: The influence of domain and microstructure, J. Appl. Phys., vol. 74, pp. 4085-4095

Visser E G and Johnson M T (1991), A novel interpretation of the complex permeability in polycrystalline ferrites, J. Magn. Magn. Mater., vol. 101, pp. 143-147

Wang X-H, Chen R-Z, Gui Z-L, Li L-T (2003), "The grain size effect on dielectric properties of BaTiO3 based ceramic," Mater. Sci. Eng.: B, vol. 99, pp. 199-202

Zaspalis V T, Tsakaloudi V, Kolenbrander M (2007), "The effect of dopants on the incremental permeability of MnZn-ferrites," J. Magn. Magn. Mater., vol 313, pp. 29-36

Znidarsic A, Drofenik M (1999), High resistivity grain boundaries in CaO-doped MnZn ferrites for high frequency power application, J. Amer. Ceram. Soc., vol. 82, pp. 359-365

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

What is claimed is:

1. A composite material comprising:
    a plurality of grains having a magnetic ferrite phase and magnetic grain boundaries surrounding the grains; and
    a plurality of nanoparticles disposed at the magnetic grain boundaries;
    wherein the nanoparticles are both magnetic and insulating, having a magnetic flux density of greater than about 100 mT and an electrical resistivity of at least about $10^8$ Ohm-cm; and
    wherein the nanoparticles are present in the composite in an amount from 0.01 wt % to 0.8 wt %.
2. The composite material of claim 1, wherein the electrical resistivity of the nanoparticles is from about $10^8$ to about $10^{12}$ Ohm-cm.

3. The composite material of claim 1, wherein the material is capable of use as a core component at an operating frequency in the range from about 100 kHz to about 1 MHz.

4. The composite material of claim 1, wherein the grains have a size of about 0.5 μm to about 50 μm.

5. The composite material of claim 1, wherein the size of the nanoparticles is in the range from about 1 nm to about 100 nm.

6. The composite material of claim 1, wherein the nanoparticles comprise garnet, hexaferrite, or spinel ferrite.

7. The composite material of claim 6, wherein the nanoparticles comprise $Y_3Fe_5O_{12}$ (YIG).

8. The composite material of claim 1, wherein the grains comprise a spinel ferrite.

9. The composite material of claim 8, wherein the spinel ferrite is a zinc ferrite, a nickel-zinc ferrite, a manganese-zinc ferrite, or a cobalt ferrite.

10. The composite material of claim 9, wherein the spinel ferrite is a manganese-zinc ferrite.

11. The composite material of claim 10, wherein the manganese-zinc ferrite is $(Mn_{0.69}Zn_{0.20})Fe_{2.11}O_4$.

12. An inductor core comprising the composite material of claim 1.

13. The inductor core of claim 12, wherein the grains comprise a spinel ferrite.

14. The inductor core of claim 13, wherein the spinel ferrite is a zinc ferrite, a nickel-zinc ferrite, a manganese-zinc ferrite, or a cobalt ferrite.

15. The inductor core of claim 13, wherein the nanoparticles are present in the composite in an amount from about 0.01 wt % to about 1 wt %.

16. The inductor core of claim 13, wherein the wherein the nanoparticles comprise high resistivity garnet, hexaferrite, or spinel ferrite.

17. A method for making a composite material, the method comprising:

providing a plurality of grains having a magnetic ferrite phase and magnetic grain boundaries surrounding the grains;

adding a plurality of nanoparticles comprising high resistivity garnet, hexaferrite, or spinel ferrite, to the grains to form a mixture; wherein the nanoparticles are present in the mixture in an amount of 0.01 wt % to 0.8 wt %;

compacting the mixture to form a core;

sintering the core mixture; and cooling the sintered mixture to room temperature, thereby obtaining the composite material.

18. The method of claim 17, wherein prior to sintering, the core is compacted to have the shape of a core selected from the group consisting of: ferrite toroid, a ferrite plate, a ferrite disk, a ferrite E-core, a ferrite EI-core, a ferrite C core, a ferrite CI core, a planar E core, an EC core, a EFD core, a EP core, a ETD core, an ER core, a planar ER core, a U core, a RM/I core, a RM/LP core, a P/I core, a PT core, a PTS core, a PM core, a PQ core, a gapped toroid, and a bobbin core.

19. A device or device component comprising the core of claim 12, wherein the device or device component is selected from the group consisting of a transformer; an electronic device; an inductor core; a switched mode power supply; a power electronic device; a power converter; a power generator; power conditioning components; an inductor device; a transmit and receive module; an electronically scanned phased arrays system; an electronic warfare system; and conditioning components for wireless and satellite communication, radar systems, power electronics, inductive devices, electronics utilizing a switched mode power supply, and a device or device component for wireless power transfer.

* * * * *